United States Patent
Chen

(10) Patent No.: US 9,323,064 B2
(45) Date of Patent: Apr. 26, 2016

(54) DYNAMIC COMMUNICATION SPLITTER

(71) Applicant: Verizon Patent and Licensing Inc., Arlington, VA (US)

(72) Inventor: David Z. Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/562,151

(22) Filed: Dec. 5, 2014

(65) Prior Publication Data

US 2015/0086155 A1  Mar. 26, 2015

Related U.S. Application Data

(62) Division of application No. 12/984,770, filed on Jan. 5, 2011, now Pat. No. 8,917,989.

(51) Int. Cl.
*G02B 26/08* (2006.01)
*G02B 27/14* (2006.01)
*H04B 10/272* (2013.01)
*G02B 6/35* (2006.01)
*G02B 6/28* (2006.01)
*G02B 27/09* (2006.01)

(52) U.S. Cl.
CPC .............. *G02B 27/14* (2013.01); *G02B 6/2817* (2013.01); *G02B 6/3512* (2013.01); *G02B 6/3558* (2013.01); *G02B 26/0816* (2013.01); *G02B 27/0905* (2013.01); *H04B 10/272* (2013.01)

(58) Field of Classification Search
CPC ...... G02B 27/14; G02B 27/09; G02B 6/2817; G02B 26/0816; G02B 27/0905; G02B 6/3558; G02B 6/3512; H04B 10/272
USPC .................................................. 398/118–131
See application file for complete search history.

(56) References Cited

U.S. PATENT DOCUMENTS

| | | | |
|---|---|---|---|
| 6,765,681 B1* | 7/2004 | Sweetser | G01M 11/0264 356/515 |
| 8,000,568 B2* | 8/2011 | Presley | G02B 6/29311 359/872 |
| 2002/0109884 A1* | 8/2002 | Presley | H04B 10/1125 398/121 |
| 2002/0176151 A1* | 11/2002 | Moon | G02B 6/262 359/298 |
| 2004/0173680 A1* | 9/2004 | Mossberg | G06K 7/12 235/454 |
| 2010/0166430 A1* | 7/2010 | Alten | H04B 10/1141 398/135 |
| 2012/0170945 A1* | 7/2012 | Chen | H04B 10/272 398/201 |
| 2015/0192860 A1* | 7/2015 | Fischer | G03F 7/70075 355/67 |
| 2015/0198805 A1* | 7/2015 | Mansharof | G02B 6/00 359/633 |
| 2015/0198891 A1* | 7/2015 | Patra | G02B 26/0833 355/67 |
| 2015/0212424 A1* | 7/2015 | Tanitsu | G02B 26/0833 399/67 |
| 2015/0303656 A1* | 10/2015 | Morita | H01S 5/143 372/44.01 |

* cited by examiner

*Primary Examiner* — Danny Leung

(57) ABSTRACT

Methods and systems for splitting an initiated signal are disclosed. An exemplary system may include a transmitter configured to selectively transmit an initiated signal, and a signal splitter in communication with the transmitter. The signal splitter may be configured to selectively split the initiated signal into a plurality of recipient signals for a plurality of recipient lines in communication with the transmitter. The signal splitter may be configured to selectively modify a number of recipient signals, e.g., by adjusting a spot size of the initiated signal on the signal splitter.

20 Claims, 4 Drawing Sheets

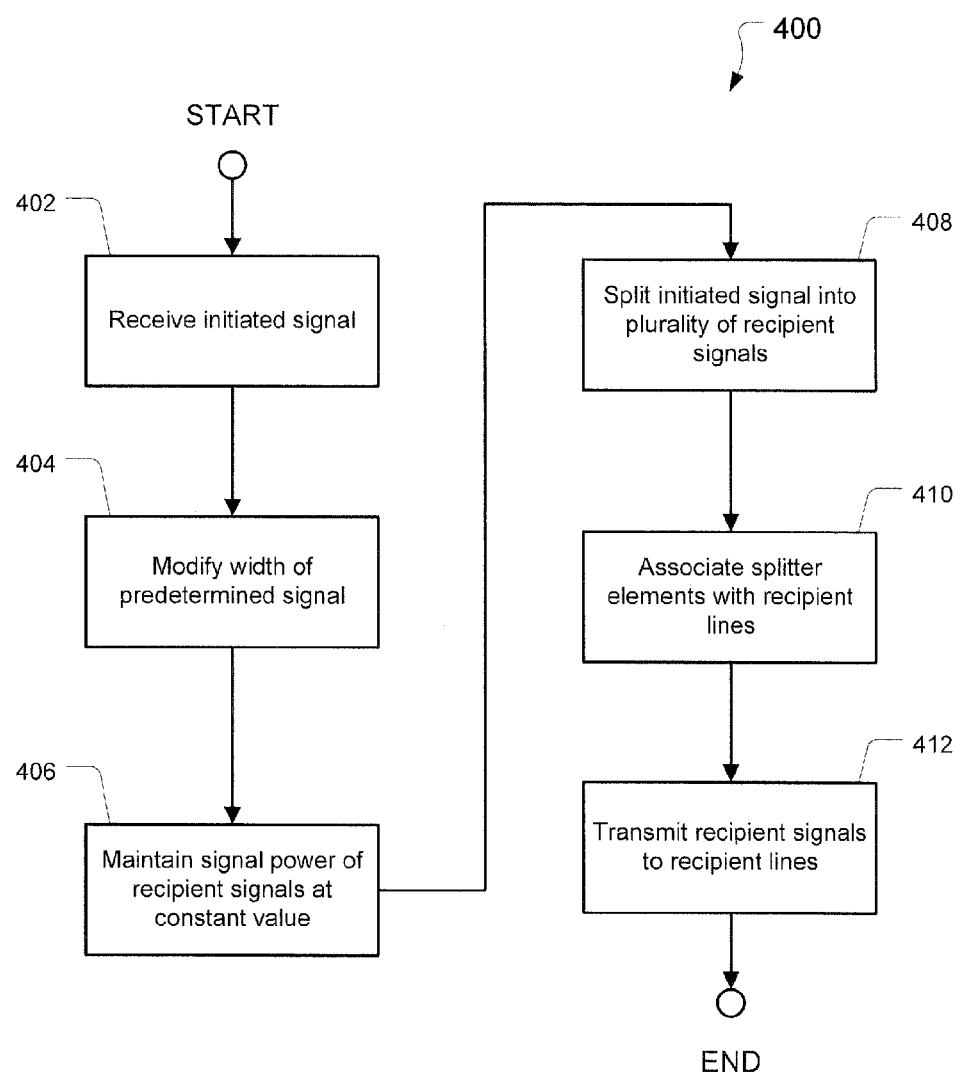

DYNAMIC COMMUNICATION SPLITTER

CROSS REFERENCE TO RELATED APPLICATIONS

This application is a Divisional of U.S. patent application Ser. No. 12/984,770, filed Jan. 5, 2011, now U.S. Pat. No. 8,917,989, issued Dec. 23, 2014, the contents of which is hereby incorporated by reference in its entirety.

BACKGROUND

Communication transmissions intended for a distributed audience are generally initiated from one or more central signal transmission facilities such as central offices to a much larger number of recipient premises. Between the central offices and the recipient premises, signals are often split to create larger numbers of downstream signals for each of the recipient premises. The splitting of signals in this manner helps maintain the uniformity of the transmissions and creates economies of scale that allow for rapid expansion of communication systems to ever increasing numbers of recipients.

Signal splitters typically split an initial signal into a predetermined number of signals that are then selectively received by an existing number of recipient premises. For example, known optical splitter devices generally split an incoming signal into a predetermined number of outgoing signals that are transmitted at all times, regardless of whether the same predetermined number of signals are necessary at any given time.

It is rare that the number of splits in the signal corresponds exactly to a number of required signals at a given time, e.g., as determined from a number of recipients requesting a signal, and systems are typically designed for at least some excess capacity. Accordingly, at least a portion of the incoming signal power is often wasted on unused signal capacity. This may be especially troublesome where signal power is at a premium, e.g., due to a relatively large number of recipients requiring a signal at any given time in a given area.

Additionally, known signal splitting devices offer little flexibility in providing desired signals to associated recipients. Typically, an incoming signal is split to a fixed number of outputs that have fixed recipient destinations. Service providers must therefore deploy service personnel to a recipient site to manually alter existing signal splitting arrangements in order to change distribution of signals to recipients or groups of recipients, e.g., to turn on service, change service levels, etc.

Accordingly, there is a need for greater flexibility in splitting communication signals while minimizing or eliminating signal power losses due to unused capacity.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

FIG. 4 illustrates a process flow diagram of an exemplary method for splitting a communication signal.

DETAILED DESCRIPTION

Various exemplary illustrations of methods and systems for splitting an initiated signal are disclosed. An exemplary system may include a transmitter configured to selectively transmit an initiated signal, e.g., an optical signal, and a signal splitter in communication with the transmitter. The signal splitter may be configured to selectively split the initiated signal into a plurality of recipient signals for a plurality of recipient lines in communication with the transmitter. The signal splitter may be configured to selectively modify a number of recipient signals by modifying a spot size of the incoming signal on the signal splitter.

An exemplary method may include receiving an initiated signal having a predetermined width, and modifying a spot size of the initiated signal on a splitting array, thereby modifying a number of splitter elements engaged by the initiated signal. The spot size of the initiated signal on the splitting array may be determined, in part, by a width of the incoming signal. Exemplary methods may further include splitting the initiated signal into a plurality of recipient signals. The plurality of recipient signals may be determined in part by the number of splitter elements engaged by the initiated signal.

Figure 1A:
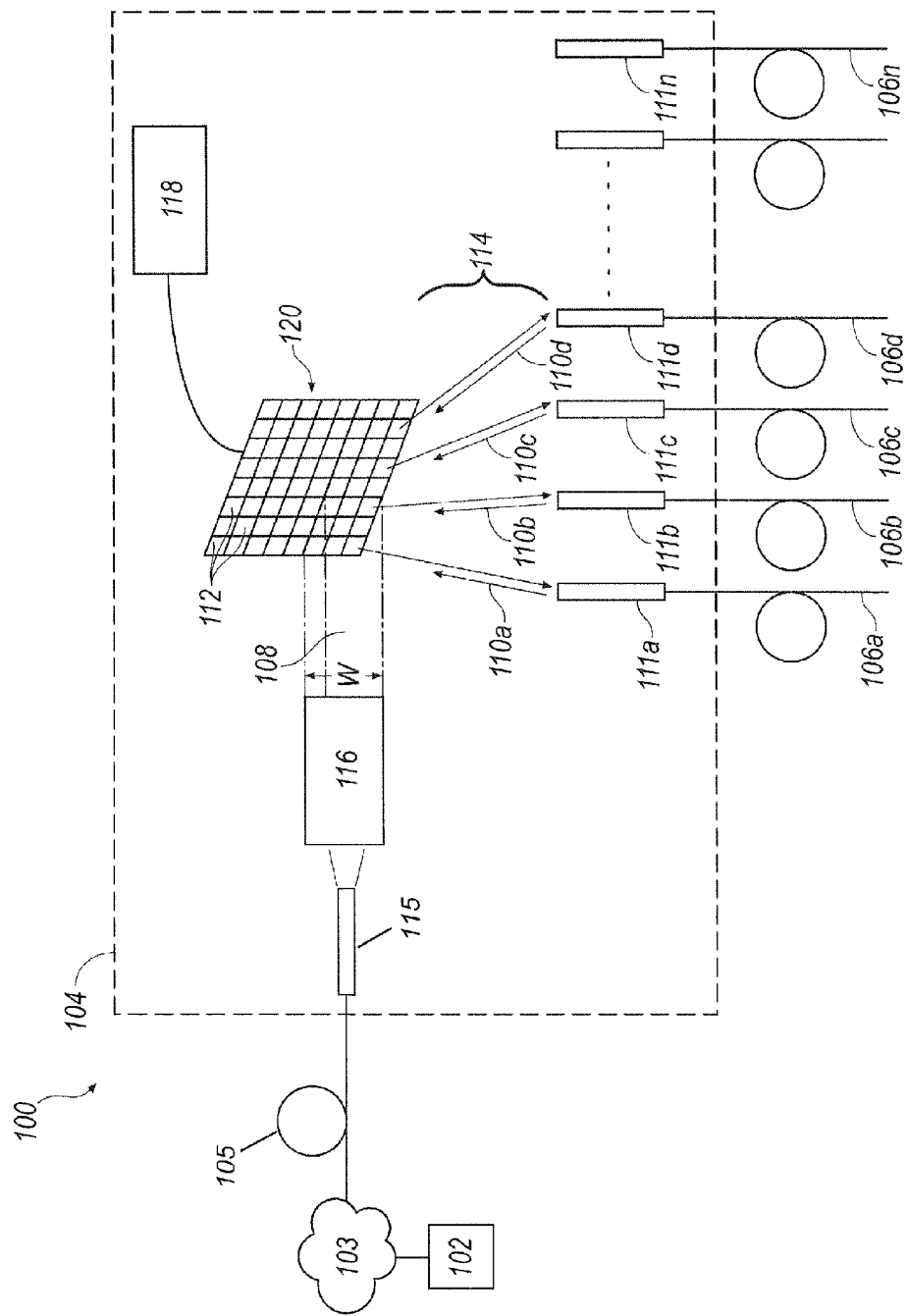
FIG. 1A illustrates a schematic illustration of an exemplary architecture of a communication system.
Figure 1B:
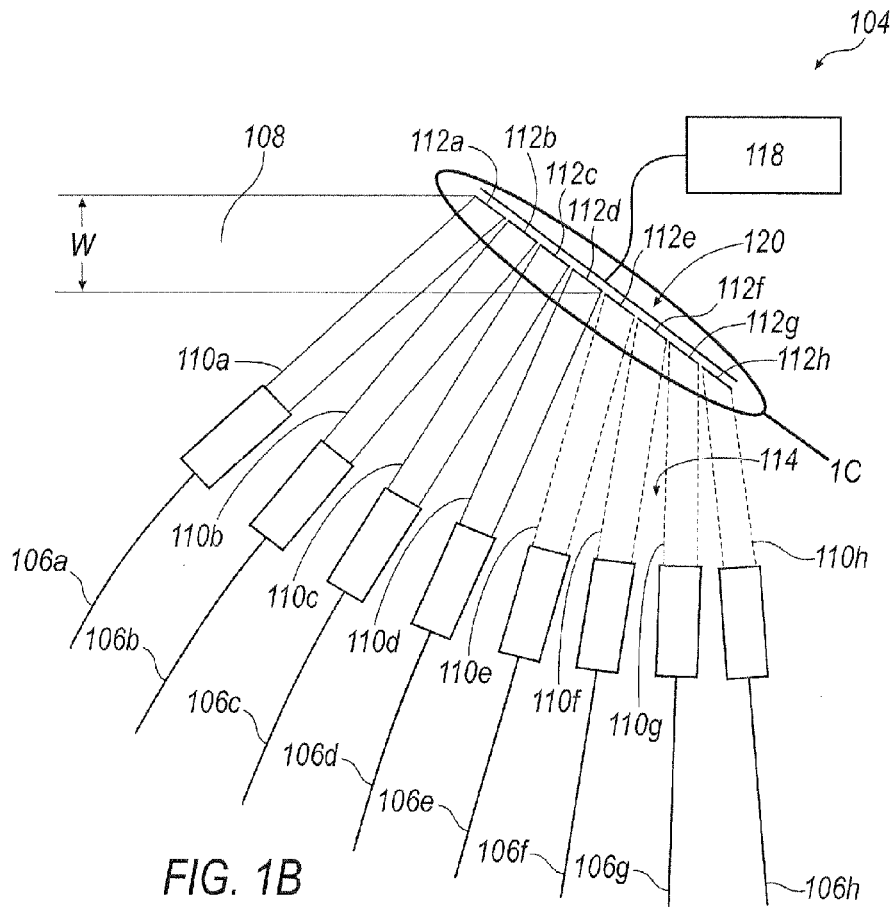
FIG. 1B illustrates a plan view of an exemplary architecture of a signal splitter assembly, including a signal splitter.

Turning now to FIGS. 1A and 1B, an exemplary communication system 100 is illustrated. Communication system 100 may generally include a central office or transmitter 102 that is configured to transmit communication signals, e.g., optical signals, to a plurality of recipient lines 106. Central office 102 may also include devices or equipment for adjusting a power level of signals transmitted from and/or received by the central office 102, such as amplifiers. The recipient lines 106 may provide media to one or more customers (not shown). In one exemplary illustration, the transmitter 102 is in communication with a plurality of recipient lines 106a, 106b, 106c . . . 106n (collectively, 106) via a network 103. Network 103 may be any appropriate type of network including, for example, a packet-switched network, such as an internet protocol (IP) network, and/or a circuit-switched network. Accordingly, it is to be understood that network 103 may include switches, links, routers, gateways, etc. as necessary to facilitate the transmission of data between various computer and mobile devices. The system 100 may be in further communication with additional communications networks and/or systems (not shown), e.g., any known types of media distribution networks, packet-switched networks, telephone networks, or the like.

As described above, in some exemplary illustrations the communication system 100 may transmit media in the form of optical signals. Accordingly, system 100 may rely upon optical media for transmitting signals to and from the central office 102. For example, splitter assembly 104 may be in communication with central office 102 and/or network 103 via optical fibers 105, represented schematically as loops in FIG. 1A. Additionally, recipient lines 106 may include optical fibers.

In one exemplary illustration, system 100 is part of a media distribution system, e.g., a cable television system where central office 102 provides media via network 103 to a plurality of recipient lines 106. Exemplary media may include cable television programming, e.g., data, voice, or video content such as movies, television shows, games, or other media that may be selected by recipients via televisions and/or set top boxes (not shown) in communication with the recipient lines 106. In another exemplary illustration, recipients may use mobile devices (not shown) in communication with recipient lines 106 via mobile networks in communication with network 103. Recipients may generally arrange for a given level of service directly with central office 102, which may then adjust content distributed via network 103 to the recipient lines accordingly. Furthermore, the system 100 may generally allow for two-way communication between the recipients via recipient lines 106, e.g., by making selections or requests via a set-top box, TV, mobile device, or other equipment (not shown).

The central office 102 may provide media using communication signals transmitted to the recipient lines 106 via a splitter assembly 104. The splitter assembly 104, as will be described further below, generally divides an incoming initiated signal 108 transmitted by the central office 102 into a plurality of components or recipient signals 110. Further, the system 100 may also allow transmission of signals from the recipient lines 106 to central office 102 via the splitter assembly 104, e.g., requests for content, feedback regarding content or system performance, etc. Accordingly, while some exemplary illustrations herein may generally focus on an incoming signal 108 being transmitted from the central office 102 to the recipient lines 106, the concepts are generally applicable to signals being transmitted from recipient lines 106 to central office 102 as well.

While only a single splitter assembly 104, and a small number of recipient lines 106 are shown in FIG. 1A, it is to be understood that at any one time there may be a great number of splitter assemblies 104 and recipient lines 106 that communicate with the transmitter 102, and vice versa. Moreover, FIG. 1A should not be interpreted to suggest that there is necessarily any geographic limitation to system 100. In fact, system 100 may facilitate communication between recipient lines 106 and transmitter 102 across cities, states, and even countries. Moreover, the central office 102 may transmit a number of signals at any given time via network 103, although a single incoming signal 108 is generally described below. For example, a plurality of signals may be transmitted between central office 102 and recipient lines 106 at any given time, including media content distributed by the central office 102 to recipient lines 106, feedback or requests being transmitted from the recipient lines 106 to central office 102, etc. As will be described further below, in some examples multiple signals may be transmitted to/from central office 102 via splitter assembly 104 across multiple wavelengths. Additionally, although a single incoming signal 108 is shown for splitter assembly 104, in some examples a splitter assembly 104 may be configured to split a number of different incoming signals 108 at a given time, as will be described further below.

The splitter assembly 104 may generally include a splitting array 120 that is configured to maintain a total signal power of the plurality of the recipient signals 110 substantially equal to an initiated signal power associated with the incoming signal 108. Additionally, the splitting array 120 may selectively adjust a number of splits, and thus a number of recipient signals 110, while maintaining the total signal power of the recipient signals at a generally constant magnitude, as will be described further below. The splitter assembly 104 may thereby provide recipient signals 110 that can be reduced or increased in number, e.g., to provide additional recipient signals 110 to additional recipient lines 106, or adjust power of recipient signals 110 individually.

Signal power of the recipient signals 110 may generally be a function of a number of splits associated with the splitter assembly 104 and the power level associated with the incoming signal 108 received by the splitter assembly 104. For example, where a greater number of recipient signals 110 are split from an incoming signal at a fixed power level 108, a resulting power level of each individual recipient signal 110 will be lower. Accordingly, power levels of recipient signals 110 may be adjusted amongst a plurality of recipient lines 106 by changing an overall number of the recipient signals 110. Further, as will be described further below an association of the recipient signals 110 with recipient lines 106 may also be modified to permit reorganizing groups of recipient signals 110 in response to changes in content being requested via recipient lines 106. Other characteristics of the splitting array 120 may also influence power levels of recipient signals 110, as will be further described below.

In one exemplary illustration, the splitting array 120 includes a plurality of splitter elements engaged by the incoming signal 108. Splitter elements may include, as illustrated in FIGS. 1A and 1B, a plurality of mirrored surfaces 112. More specifically, mirrored surfaces 112 are illustrated in a perspective view in the schematic of FIG. 1A, while being shown in an overhead view in FIG. 1B. The mirrored surfaces 112 may each generally be associated with one of the recipient lines 106. Moreover, as we described further below, the splitting array 120 may selectively alter associations of the various recipient signals 110 with different recipient lines 106. In one exemplary illustration, the splitter assembly 104 defines a free space zone 114 between the splitting array 120 and the recipient lines 106. The free space zone 114 may allow for transmission of recipient signals 110 without a mechanical structure providing a direct link, e.g., optical fibers. Rather, the recipient signals 110 may be transmitted, e.g., as optical or light-based signals, across a gaseous medium such as ambient air, an inert gas, or the like. Accordingly, signals split from the splitting array 120 need not be structurally tied to lines such as optical fibers that extend from the splitting array 120 directly to the recipient lines 106.

Splitting array 120 may also be configured to adjust incoming signal 108 for distortions in the signal 108. For example, optical signals may be distorted, dispersed, or may otherwise have inconsistencies accumulated during transmission from central office 102 that may be corrected, e.g., by adjusting an angle of one or more splitting elements or mirrored surfaces 112 included in the splitting array 120.

The splitter assembly 104 may further include a magnifying element 116 that is configured to manipulate a size of the incoming signal 108 to facilitate division of the incoming signal 108 into the plurality of recipient signals 110. For example, in one exemplary illustration, the magnifying element 116 generally increases a width W. As will be described further below, increasing the width W of the incoming signal 108 generally increases the spot size or footprint formed by the incoming signal upon splitting array 120, thereby increasing the number of recipient signals 110. In some examples, a spot size or footprint of the incoming signal 108 may be a cross-sectional area of the incoming signal 108. Accordingly, changes to a width W of the incoming signal 108 may also in some cases result in a similar change to a cross-sectional area of the incoming signal 108. More specifically, a number of splits or recipient signals 110 reflected by the splitting array 120 may be modified by changing a size of the incoming signal 108, e.g., as represented by a spot size or footprint of the incoming signal 108 on the splitting array 120, to adjust the number of mirrored surfaces 112 impinged upon by the incoming signal 108.

In another exemplary illustration, a spot size of the incoming signal 108, and thus a number of splitting elements 112 engaged by the incoming signal 108, may be altered by rotating the splitting array 120 with respect to an orientation of the incoming signal 108. In fact, the actual width W of the incoming signal 108 need not be directly modified in order to alter a spot size of the incoming signal 108 on the splitting array 120. More specifically, as illustrated in FIG. 1B, which is an overhead or plan view of splitting array 120, a spot size of the incoming signal 108 initially includes splitting elements 112*a*, 112*b*, 112*c*, and 112*d*. Splitting elements 112*e*, 112*f*, 112*g*, and 112*h* may be engaged by increasing the width W of the incoming signal 108, and/or by rotating splitting array 120 so that splitting elements 112*a*-112*h* are each engaged by the incoming signal 108. Accordingly, the number of splits enacted by the splitting array 120 and the splitter assembly 104 may be generally modified during operation by modifying a width W of the incoming signal 108 and/or an orientation of the splitting array 120 with respect to incoming signal 108.

Splitter assembly 104 may also include an amplifier 115 that is configured to provide incoming signal 108 to the magnifying element 116 at a desired power level. For example, where incoming signal 108 is received from an optical fiber 105, amplifier 115 may increase or decrease a power level associated with the incoming signal 108, e.g., to provide the incoming signal 108 at a desired level. Additionally, amplifier 115 may align incoming signal 108 with magnifying element 116 and/or splitter array 120. More specifically, the amplifier 115 may match a beam width W, cross-sectional area of the incoming signal 108, or an angle of the incoming signal 108 with the splitter array 120, e.g., to ensure a spot size of the incoming signal 108 on the splitter array 120 is a desired magnitude. Further, the amplifier 115 may also ensure that the spot size of the incoming signal 108 is properly aligned with the splitting array 120, e.g., that no portion of the incoming signal 108 is misaligned or "off" of the splitting array 120.

Splitter assembly 104 may also include a device for adjusting signals being transmitted from the recipient lines 106 to the central office 102 downstream of the splitting array 120. For example, recipient lines 106 may each include a connector 111 configured to align recipient lines 106 with an associated splitting element, e.g., mirrored surface 112. Further, the connectors 111 may include any devices for adjusting signal power levels to ensure the signals received from the recipient lines 106 are adequately matched to the splitting array 120, e.g., an amplifier.

As best illustrated in FIG. 1B, a number of splits or recipient signals 110 generated by splitter assembly 104 can be adjusted according to demand by recipients via recipient lines 106. For example, where demand increases for a given signal 108 amongst a plurality of recipient lines 106, the number of splits may be increased by increasing beam width W, thereby increasing the number of splits and recipient signals 110. More specifically, as shown in FIG. 1B signal 108 initially impinges upon mirrored surfaces 112*a*, 112*b*, 112*c*, and 112*d*, thereby providing four distinct recipient signals 110*a*, 110*b*, 110*c*, and 110*d* that are transmitted to recipient lines 106*a*, 106*b*, 106*c*, and 106*d*. When demand for a given incoming signal 108 decreases, for example where a recipient associated with recipient line 106*d* turns off a set top box or changes channels, a beam width W associated with the incoming signal 108 may be generally decreased, thereby decreasing the number of mirrored surfaces 112 impinged upon by the incoming signal 108 and thus the number of recipients signals 110. For example, the beam width W may be reduced to impinge only upon mirrored surfaces 112*a*, 112*b*, and 112*c*, thereby reducing the number of recipient signals 110 generated by the splitting array 120 to three. In another example illustration, when demand increases for recipient signal 110, beam width W may be increased such that it impinges upon all eight mirrored surfaces 112*a*, 112*b*, 112*c*, 112*d*, 112*e*, 112*f*, 112*g*, and 112*h*, thereby creating additional recipient signals 110 that may be transmitted to recipient lines 106. Accordingly, the beam width W may correlate directly to a number of possible connections or splits.

Moreover, as noted above the mirrored surfaces 112 may be individually manipulated to alter associations of recipient signals 110 with recipient lines 106. More specifically, while FIG. 1B illustrates mirrored surface 112*a* as transmitting a recipient signal 110*a* to recipient line 106*a*, this may be altered according to demand. Where a recipient associated with recipient line 106*a* changes a channel, selects a new media product, turns off an associated set top box or television, or otherwise ceases a demand for recipient signal 110*a*, the mirrored surface 112*a* may reflect the recipient signal 110*a* to a different recipient line 106. For example, if another recipient associated with recipient line 106*e* requests service, the mirrored surface 112*a* may rotate to reflect the recipient signal 110*a* to recipient line 106*e*. Accordingly, while the beam width W may correspond to a number of possible splits or recipient signals 110 generated by splitter assembly 104, each individual recipient line 106 may generally be freely associated and reassociated with any of the splitter elements or mirrored surfaces 112. Additionally, where a width W is reduced such that a splitter element 112 associated with a recipient line 106 desiring a recipient signal no longer falls within the beam width W, a different splitter element 112 falling within the modified beam width W may be assigned to the recipient line 106. Accordingly, some inefficiency in the form of additional splitter elements 112 not in use may be desired to allow additional flexibility in assigning splitter elements 112 to recipient lines, modifying the assignments, and allowing additional capacity for addition of more recipient signals 110.

Alterations in distribution of recipient signals 110 using splitter assembly 104 may be particularly convenient in multi-dwelling unit environments such as apartments, hotels, etc. where mechanical recipient lines 106 are generally installed in a number of units. Accordingly, service levels may be altered "on-demand" without deployment of service personnel to install splitting devices, alter distribution of signals 108, etc.

Splitter assembly 104 may be generally sealed, e.g., from external contaminants such as dirt, moisture, or other foreign matter that may otherwise interfere with the operation of the splitter assembly 104. Further, splitter assembly 104 may include any power mechanisms, e.g., a backup battery, to maintain operation during a power outage or other equipment malfunction.

The splitter assembly 104 may also generally facilitate adjustments in signal power, including decreasing signal power by creating additional splits of incoming signal 108. For example, where a recipient line 106 is associated with a device such as a set top box (not shown) that has a maximum desired power level associated with the set top box, it may be desirable to decrease an incoming signal power of the recipient signal 110 associated with the recipient line 106. More specifically, where demand suddenly decreases for a given signal 108 and a number of splits associated with a given splitter assembly 104 is reduced, power of the remaining recipient signals 110 individually may increase beyond a level appropriate for hardware included downstream of the splitter assembly 104, e.g., recipient line 106, a set top box, or the like. Accordingly, the number of splits at the splitting array 120 may be maintained at an elevated level to prevent power of each individual signal 110 from exceeding a desired amount. More specifically, as noted above to the extent the power of a given recipient signal 110 is influenced by the number of splits employed by the splitting array 120, increasing a number of splits may allow selective wasting of the power associated with signal 108, in order to adjust signal power appropriately.

A power level associated with recipient signals 110 individually may also be influenced by a relative size of mirrored surfaces 112. More specifically, while mirrored surfaces 112 are generally illustrated as having identical sizes, certain mirrored surfaces may be larger or smaller such they reflect a different proportion of the incoming signal 108, as determined in part by the relative portion of the width W impinging upon a given mirrored surface.

The splitter assembly 104 may also facilitate redistributing of signal traffic and in system 100. For example, as the splitter assembly 104 may be generally flexible in assigning and reassigning recipient signals 110 amongst recipient lines 106, system 100 may generally freely reassign or regroup recipient signals 110 to suit recipient demand at any given time. Further, as noted above splitter assembly 104 may include additional splitting elements 120 to increase flexibility in the number of recipient signals 110 that may be created, and/or the number of recipient lines 106 to which service may be provided by splitter assembly 104.

System 100 may employ various wavelength division multiplexing concepts to provide additional capacity and/or flexibility in providing recipient signals 110. For example, a diffraction grading or coating may be applied to one or more of the mirrored surfaces 112 of splitting array 120 to allow different wavelengths in an incoming signal 108 to be reflected at different angles. In one exemplary illustration, a mirrored surface 112 having a diffraction grading reflects different wavelengths of an incoming signal 108 at different angles. Accordingly, a single mirrored surface 112 may generate a plurality of recipient signals 110 that correspond to a plurality of signals at different wavelengths included in incoming signal 108.

Splitter assembly 104 may also facilitate remote troubleshooting of system 100. For example, splitter assembly 104 may differentiate a given recipient signal 110 from the remaining recipient signals 110 associated with the splitting array 120. In one exemplary illustration, a single one of the mirrored surfaces 112 may add a dithering signal to the recipient signal 110 that is transmitted to the recipient line 106. For example, as best seen in FIG. 1B, mirrored surface 112a may add a dithering signal or other feature differentiating the recipient signal 110a from the remaining recipient signals 110b, 110c, 110d, etc. Exemplary dithering signals may include, but are not limited to, a wobble in the signal 110a caused by a mechanical manipulation of a mirrored surface 112, or an additional signal at a different frequency from signal 110a, merely as examples.

Central office 102 may generally troubleshoot recipient problems by measuring the response of downstream components receiving the dithering signal. For example, a recipient may provide feedback regarding response of downstream components such as a set top box, television, or mobile device directly to central office 102. A service provider may thereby avoid deploying service personnel to a recipient site to the extent a recipient's direct observation of any effect a dithering signal may have upon the downstream components can provide helpful troubleshooting data to central office 102.

Figure 1C:
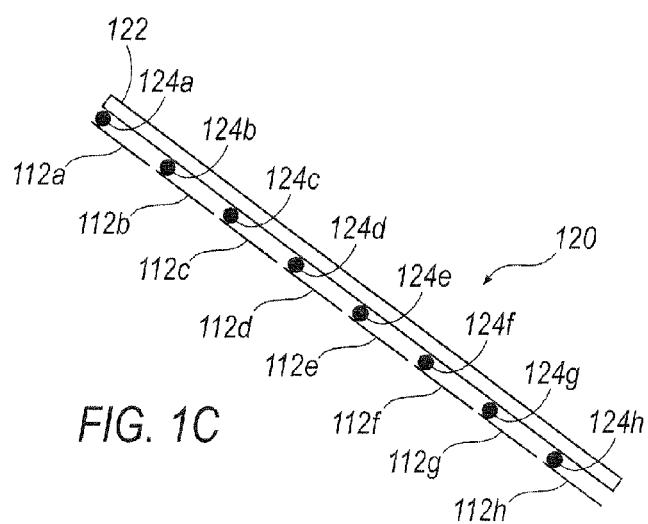
FIG. 1C illustrates a plan view of an exemplary architecture of the signal splitter of FIG. 1C.

As best seen in FIG. 1C, in one example the splitting array 120 may generally include three components. More specifically, the splitting array 120 includes the mirrored surfaces 112, a backing layer 122, and hinges 124 that secure to mirrored surfaces 112 to backing layer 122 while also allowing relative rotation of each of the mirrored surfaces 112 with respect to the backing layer 122.

In one exemplary illustration, the mirrored surfaces 112 are etched from the backing layer 122, leaving a thinned portion. Accordingly, in this exemplary illustration, the thinned portion may be a living hinge serving as hinge 124. Accordingly, the mirrored surfaces 112 and hinges 124 may be integrally formed in an etching process associated with the backing layer 122.

In another exemplary illustration, any of the mirrored surfaces 112, backing layer 122, and/or hinges 124 may be formed of an electrically responsive material that facilitates movement of mirrored surfaces 112. For example, backing layer 122 may be a micro electronic circuit or integrated circuit that is generally responsive to changes in an applied electric potential or voltage. Accordingly, the hinges 124 and/or the integrated circuit 122 may rotate any one or more of the mirrored surfaces 112 relative to the backing layer 122 according to an applied voltage or changes to an applied voltage. In another example, the hinges 124 are configured to respond to an applied electrical potential with varying levels of torque corresponding to the applied voltage. The mirrored surfaces 112 may thereby be independently rotated with respect to the backing layer 122.

The generally square shape of splitting array 120 may be advantageous by allowing hinges 124 to be generally aligned with one another. More specifically, as shown in FIG. 1C the hinges 124a-124f may be two-dimensional hinges, e.g., living hinges extending along an edge of the mirrored surfaces 112, that are each disposed on a same side of the mirrored elements 112a-112h. Accordingly, the mirrored surfaces 112 may rotate in a same direction with respect to the backing layer 122. The recipient lines 106a-106h may be in positioned in a same plane as the rotation of the mirrored elements 112a-112h, thereby simplifying alignment of the various recipient signals 110a-110h with the recipient lines 106 by keeping the signals 110 within the same plane. Alternatively, hinges 124 may be configured to allow for rotation of the mirrored surfaces 112 in three dimensions, which may offer greater flexibility by allowing recipient signals 110 to be directed to recipient lines 106 in different rows and columns of the splitting array 120.

As illustrated in FIGS. 1A and 1B, movement of any one or more of mirrored surfaces 112 may be coordinated by a controller 118 in communication with the splitting array 120. The controller 118 may be configured to enact movement of each of the mirrored surfaces 112, e.g., according to a voltage applied to the splitting array 120 by the controller 118. Accordingly, movement of any one or more of the mirrored surfaces 112 may be controlled remotely, e.g., by central office 102. The controller 118 may also be in communication with another controller (not shown) configured to modify the beam width W, or may itself be configured to modify the beam width W, e.g., by communicating directly with magnifying element 116. Furthermore, controller 118 may also be configured to control the power of the incoming signal 108, e.g., by communicating with central office 102. Accordingly, controller 118 may generally serve as a consolidated control of not only the number of recipient signals 110 generated by the splitter assembly 104, but also the assignments of the various splitter elements 112 to recipient lines 106 and the overall power level of the incoming signal 108. Controller 118 may further be configured to directly modify the power level of the incoming signal 108, thereby advantageously allowing the controller 118 to compensate for upstream issues in system 100 that affect the power level of the incoming signal 108.

Computing devices in various examples, such as controller 118, may each include instructions executable by one or more computing devices such as those listed above. Such instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any tangible medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of tangible computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, as described hereinafter, or any other medium from which a computer can read.

Figure 2A:
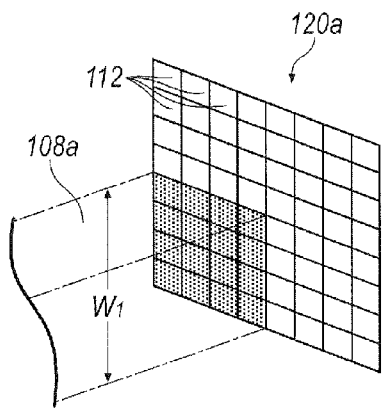
FIGS. 2A and 2B illustrate an exemplary signal splitter having a generally quadrangular shape.
Figure 2B:
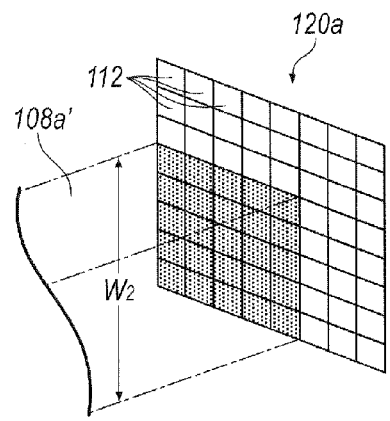

Splitting element 120 may take any geometrical shape or configuration that is convenient, such as square, triangular, or circular, merely as examples. A generally square splitting array 120 is shown in FIGS. 1A, 1B, and 1C, and is illustrated in further detail in FIGS. 2A and 2B. Splitting element 120a may include a plurality of mirrored surfaces 112 that are arranged in a generally square array. The mirrored surfaces 112 are arranged in a grid having eight columns and rows, resulting in 64 total mirrored surfaces 112 in the splitting array 120. The incoming signal 108a is shown in FIG. 2A as having an initial beam width $W_1$ that impinges upon a four-by-four grid of mirrored surfaces 112, resulting in sixteen (16) splits of the incoming signal 108a. By contrast, in FIG. 2B, the beam width $W_2$ has been increased such that the incoming signal 108a' impinges upon a five-by-five grid of mirrored surfaces 112, resulting in 25 overall splits and thus 25 recipient signals 110 (not shown in FIGS. 2A and 2B). A square array may generally allow for positioning of hinges 124 along a same side of the mirrored surfaces 112, thereby allowing for alignment of the rotation of mirrored surfaces 112 in a same plane, as described above.

Figure 3A:
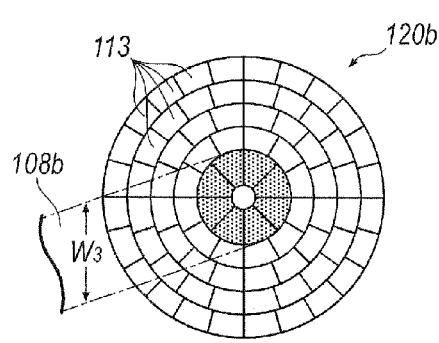
FIGS. 3A and 3B illustrate an exemplary signal splitter having a generally circular shape.
Figure 3B:
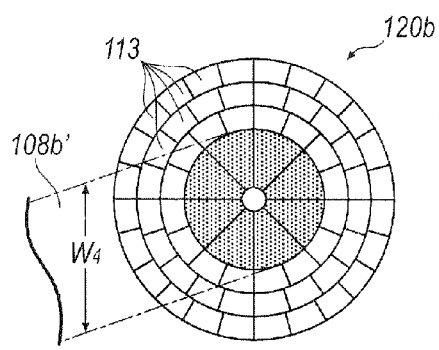

Turning now to FIGS. 3A and 3B, another exemplary splitting array 120b is illustrated. The splitting array 120b is generally circular. However, the concept of increasing a width or size of the incoming signal 108b to increase a number of splits, and therefore recipient signals 110, is generally similar to that described above regarding splitting array 120a. As shown in FIG. 3A, an incoming signal 108b has an initially relatively small width $W_3$ impinging upon a predetermined number of mirrored surfaces 113, resulting in a corresponding number of splits. In FIG. 3B, the incoming signal 108b' has an enlarged width $W_4$, and impinges upon a greater number of mirrored surfaces 113, resulting in a corresponding increase in the number of splits. A generally circular array, for example as illustrated in FIGS. 3A and 3B, may be convenient where the incoming signal 108 has a generally circular cross-section or is otherwise similarly shaped in cross-section as the generally circular shape of the splitting array 120b, in order to maximize an amount of the incoming signal 108 that is reflected by the mirrored surfaces 112.

Proceeding now to FIG. 4, an exemplary process 400 is illustrated. Process 400 may generally begin at block 402, where an initiated signal is received. For example, an initiated signal 108 may have a predetermined beam width W, as described above. Further, the initiated signal 108 may be adjusted to provide a desired input power level. For example, an amplifier 115 may increase the power level of the initiated signal 108, e.g., if the power level is below a desired level. Alternatively, a power level of the initiated signal 108 may be decreased, e.g., to a standardized input power level appropriate for the magnification element 116. Process 400 may then proceed to block 404.

At block 404, the predetermined width of the incoming signal may be modified, thereby modifying a number of splitter elements engaged by the initiated signal. For example, as described above a number of splits and a corresponding number of recipient signals 110 may be increased or decreased during use by the splitting array 120. More specifically, in one exemplary illustration, a beam width W associated with an incoming signal 108 may be generally increased to allow the initiated signal 108 to impinge upon a greater number of mirrored surfaces 112 associated with the splitting array 120, thereby increasing the number of recipient signals 110 generated by the splitting array 120. Alternatively, a width W of the initiated signal 108 may be decreased, thereby decreasing the number of mirrored surfaces 112 upon which the initiated signal 108 impinges and decreasing a number of recipient signals 110.

Proceeding to block 406, an overall signal power of the recipient signals may be maintained at a generally constant value during the modification of the width of the initiated signal. As described above, where the power of the initiated signal 108 generally remains the same, an increase in the number of splits in the initiated signal 108 decreases the power of the resulting recipient signals 110 individually. At the same time, the overall power of the recipient signals 110 collectively may remain substantially the same, and an overall number of recipient signals 110 may be altered. Accordingly, where recipients are experiencing difficulties, e.g., due to inadequate signal power, a number of splits may be reduced at the splitting array 120, thereby increasing the power of each individual signal 110. Additionally, no adjustment of a power of the incoming signal 108 is needed. Moreover, the selective increasing and decreasing of the number of recipient signals 110 may be done remotely via a controller 118, and may thereby reduce any need to deploy service personnel.

In an alternative exemplary illustration, a signal power of the initiated signal 108 may be adjusted in combination with any adjustments to the width W and/or number of recipient signals 110 generated. For example, where more recipient signals 110 are desired, and maintaining the individual signal power of the recipient signals 110 is also desired, the signal power of the initiated signal may be increased as the width W is increased. Further, the adjustments in signal power of initiated signal 108 and the number of recipient signals 110 may be coordinated to maintain the signals 110 at a generally constant value, thereby preventing any power disruptions in the recipient signals 110. Process 400 may then proceed to block 408.

At block 408, the initiated signal may be split into a plurality of recipient signals, the plurality of recipient signals determined in part by the number of splitter elements engaged by the initiated signal. More specifically, as described above the initiated signal 108 may be reflected off of a splitting array 120 including a plurality of mirrored surfaces 112. Further, the number of mirrored surfaces 112 may be determined at least in part by the number of mirrored surfaces 112 covered by the beam width W of the initiated signal 108.

Proceeding to block 410, splitter elements associated with a splitting array 120 may generally be selectively associated with various recipient lines 106. For example, as described above, as the splitter assembly 104 relies at least in part upon a free space portion 114 that is disposed between the splitting array 120 and the recipient lines 106, recipient signals 110 may be redistributed amongst the plurality of recipient lines 106. Accordingly, although a given splitting element, e.g., mirrored surface 112a may have an initial association with a recipient line, for example, recipient line 106a, the mirrored surface 112a may be realigned with another recipient line 106b, 106c, etc. Accordingly, when certain recipients turn on or off service, the splitting arrangement may be modified to suit demand. Process 400 may then proceed to block 410.

At block 412, the recipient signals 110 may be transmitted to the recipient lines 106. For example, recipient signals 110 may be directed by the splitting array 120 to a given recipient line 106 for transmission to a recipient (not shown) according to demand received by the recipients. Process 400 may then terminate.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving an initiated signal having a beam width;
   modifying a spot size of the initiated signal in advance of engaging a splitting array by changing the beam width of the initiated signal, thereby modifying a number of splitter elements engaged by the initiated signal;
   splitting the initiated signal into a plurality of recipient signals, the plurality of recipient signals determined in part by the number of splitter elements engaged by the initiated signal; and
   maintaining a total signal power of the plurality of recipient signals at a first substantially constant value while modifying the beam width of the initiated signal.

2. The method of claim 1, wherein a signal power of the initiated signal remains at a second substantially constant value.

3. The method of claim 1, further comprising modifying a signal power of the initiated signal.

4. The method of claim 1, wherein modifying a number of splitter elements engaged by the initiated signal includes magnifying the initiated signal to selectively increase and decrease the beam width of the initiated signal.

5. The method of claim 1, wherein modifying a number of splitter elements engaged by the initiated signal includes rotating the splitting array relative to an orientation of the initiated signal.

6. The method of claim 1, wherein splitting the initiated signal into a plurality of recipient signals includes engaging a plurality of mirrored surfaces with the initiated signal.

7. The method of claim 6, further comprising associating each of the plurality of mirrored surfaces with a corresponding recipient line.

8. The method of claim 7, further comprising reassociating at least one of the plurality of mirrored surfaces with a different recipient line.

9. The method of claim 6, further comprising altering one of the recipient signals associated with one of the plurality of mirrored surfaces, thereby differentiating the one of the recipient signals from the remaining recipient signals.

10. The method of claim 1, further comprising transmitting the plurality of recipient signals from the splitting array through a light-transmitting material, and establishing the light-transmitting material as a plurality of optical fibers.

11. The method of claim 1, further comprising transmitting the recipient signals through free space along at least a portion of a path of at least one of the recipient signals.

12. A method, comprising:
   receiving an initiated signal having a beam width;
   modifying a spot size of the initiated signal in advance of engaging a splitting array by changing the beam width of the initiated signal, thereby modifying a number of splitter elements engaged by the initiated signal;

maintaining a total signal power of the plurality of recipient signals at a first substantially constant value while modifying the beam width of the initiated signal, a signal power of the initiated signal remaining at a second substantially constant value; and splitting the initiated signal into a plurality of recipient signals, the plurality of recipient signals determined in part by the number of splitter elements engaged by the initiated signal.

13. The method of claim 12, further comprising:

engaging a plurality of mirrored surfaces with the initiated signal;

associating each of the plurality of mirrored surfaces with a corresponding recipient line; and selectively associating the plurality of mirrored surfaces with a plurality of recipient lines in response to a demand from the recipient lines.

14. The method of claim 12, further comprising transmitting the recipient signals through free space along at least a portion of a path of at least one of the recipient signals.

15. A method, comprising:

receiving an initiated signal having a beam width;

modifying a spot size of the initiated signal in advance of engaging a splitting array by changing the beam width of the initiated signal, thereby modifying a number of splitter elements engaged by the initiated signal; and maintaining a total signal power of the plurality of recipient signals at a first substantially constant value while modifying the beam width of the initiated signal, a signal power of the initiated signal remaining at a second substantially constant value.

16. The method of claim 15, further comprising:

engaging a plurality of mirrored surfaces with the initiated signal;

associating each of the plurality of mirrored surfaces with a corresponding recipient line; and selectively associating the plurality of mirrored surfaces with a plurality of recipient lines in response to a demand from the recipient lines.

17. The method of claim 12, wherein modifying a number of splitter elements engaged by the initiated signal includes magnifying the initiated signal to selectively increase and decrease the beam width of the initiated signal.

18. The method of claim 15, wherein modifying a number of splitter elements engaged by the initiated signal includes magnifying the initiated signal to selectively increase and decrease the beam width of the initiated signal.

19. The method of claim 12, wherein modifying a number of splitter elements engaged by the initiated signal includes rotating the splitting array relative to an orientation of the initiated signal.

20. The method of claim 15, wherein modifying a number of splitter elements engaged by the initiated signal includes rotating the splitting array relative to an orientation of the initiated signal.

\* \* \* \* \*